(12) United States Patent
Wright et al.

(10) Patent No.: US 6,751,958 B1
(45) Date of Patent: Jun. 22, 2004

(54) PHYSICAL CHEMISTRY COMPRESSION

(75) Inventors: Scott Edward Wright, Placitas, NM (US); Craig Chang, Des Plaines, IL (US)

(73) Assignee: Honeywell International Inc., Morristown, NJ (US)

( * ) Notice: Subject to any disclaimer, the term of this patent is extended or adjusted under 35 U.S.C. 154(b) by 144 days.

(21) Appl. No.: 09/947,885

(22) Filed: Sep. 6, 2001

(51) Int. Cl.[7] .............................................. F01K 25/06
(52) U.S. Cl. ............................ 60/649; 60/651; 60/671
(58) Field of Search ........................... 60/649, 651, 671, 60/648; 55/48, 58, 62

(56) References Cited

U.S. PATENT DOCUMENTS

| | | |
|---|---|---|
| 4,026,680 A | 5/1977 | Collins |
| 4,147,523 A | 4/1979 | Izumo |
| 4,194,892 A | 3/1980 | Jones et al. |
| 4,203,734 A | 5/1980 | Winter et al. |
| 4,338,101 A | 7/1982 | Tuttle |
| 4,376,640 A | 3/1983 | Vo |
| 4,479,814 A | 10/1984 | Oliker |
| 4,545,787 A | 10/1985 | Hegarty |
| 4,696,681 A | 9/1987 | LLoyd-Williams |
| 4,715,867 A | 12/1987 | Vo |
| 4,754,607 A | 7/1988 | Mackay |
| 4,836,833 A * | 6/1989 | Nicholas et al. ............... 95/55 |
| 4,968,329 A | 11/1990 | Keefer |
| 5,012,037 A | 4/1991 | Doshi et al. |
| 5,096,469 A | 3/1992 | Keefer |
| 5,116,396 A * | 5/1992 | Prasad et al. ................. 62/655 |
| 5,120,517 A * | 6/1992 | Elshout .................... 423/239.1 |
| 5,213,593 A | 5/1993 | White, Jr. |
| 5,229,089 A | 7/1993 | Ramachandran et al. |
| 5,256,172 A | 10/1993 | Keefer |
| 5,451,248 A * | 9/1995 | Sadkowski et al. ............ 95/99 |
| 5,453,112 A * | 9/1995 | Sinicropi et al. .............. 95/41 |
| 5,536,300 A | 7/1996 | Reinhold, III et al. |
| 5,656,067 A | 8/1997 | Watson et al. |
| 5,737,912 A | 4/1998 | Krakowitzer |
| 5,792,239 A | 8/1998 | Reinhold, III et al. |
| 5,855,112 A | 1/1999 | Bannai et al. |
| 6,035,641 A | 3/2000 | Lokhandwala |
| 6,051,050 A | 4/2000 | Keefer et al. |
| 6,287,365 B1 * | 9/2001 | Markovs et al. ............... 95/96 |

FOREIGN PATENT DOCUMENTS

| | | |
|---|---|---|
| JP | 59098715 A | 6/1984 |
| JP | 01262920 A | 10/1989 |
| WO | WO97/09524 | 3/1997 |

* cited by examiner

*Primary Examiner*—Hoang Nguyen
(74) *Attorney, Agent, or Firm*—Oral Caglar, Esq.

(57) ABSTRACT

A method and apparatus is disclosed to increase the pressure of a feed gas through chemical compression. A feed gas such as natural gas is introduced into a vessel and is adsorbed onto material contained therein. The vessel is heated, for example by the waste heat from a turbogenerator. The feed gas desorbs and is released from the vessel at an increased pressure. Multiple vessels may operate in cooperation to collectively provide a substantially continuous flow of feed gas at an increased pressure. An accumulator also may be provided to collect, cool and store the feed gas at the increased pressure.

25 Claims, 5 Drawing Sheets

PHYSICAL CHEMISTRY COMPRESSION

FIELD OF INVENTION

This invention generally relates to chemical compression of gases and more particularly to compression of gas through a temperature swing adsorption apparatus and method using waste heat from a turbogenerator.

BACKGROUND

Gas powered industrial turbines provide efficient and reliable power with minimum environmental impact. These turbines may use a variety of gaseous fuels, including coal-derived syngas, biomass gas products or natural gas, typically available at relatively low pressures at or near the site. Because the gas must be introduced into the combustion chamber of the turbine at pressures at or above the typical combustion pressure, mechanical gas compressors are commonly used to increase the pressure of the gas before introduction as fuel.

In natural gas powered microturbines (turbogenerators) in the 20 kW to 500 kW range, the gas compressors typically are converted air compressors or refrigerant compressors, also commonly used for small air conditioning systems. These microturbines (turbogenerators) typically require that the pressure of the natural gas be increased from distribution pressure (near 1 atmosphere), above the combustion pressure (about 4 atmospheres) and to as high as 12 atmospheres or more for higher power units. Such mechanical compressors are energy intensive and may consume 7% to 10% of the output power of a typical microturbine turbogenerator at full power and up to 30% at half power. This reduces the system thermal efficiency by the same percentage.

For example, a mechanical compressor mechanically squeezes air from a given volume into a smaller volume, resulting in a higher pressure and temperature. There are many means of accomplishing this (centrifugal, diffusion, piston compression, rotary screw compression, scroll compression, rotary valve (Wankel), involute (gear, gyro), etc.). Notwithstanding their differences, these types of mechanical compressors are designed to increase the gas pressure by the desired pressure ratio and also will increase the temperature, depending on the efficiency of the device. In general, the lower the efficiency, the higher the temperature and the more power will be needed to produce gas flow at the desired pressure.

One type of mechanical compressor currently available is a piston reciprocating compressor, which uses an inlet throttling technique of flow modulation to provide improved low flow power characteristics. In practice, this creates significant vibration leading to poor reliability, poor durability, excessive noise and excessive oil carryover. These characteristics are the result of the reciprocating piston action and the difficulty in balancing that type of machinery in a cost efficient manner.

Other types of mechanical compressors include scroll type and twin screw type compressors, both of which use a direct electric motor drive. In addition to being energy intensive, these rotary type compressors use a bypass method of flow modulation, taxing part power operation by as much as 30%. These types of mechanical compressors are less noisy and more durable than piston reciprocating compressors, but are relatively much more expensive.

As such, a need exists for an improved apparatus and method for compression of gas for use as fuel in a turbine.

DETAILED DESCRIPTION OF THE INVENTION

This invention generally relates to chemical compression of gases and more particularly to compression of gas through a temperature swing adsorption apparatus and method using waste heat from a turbogenerator.

In one embodiment of the invention, natural gas is selectively directed into a vessel containing adsorbent material, which adsorbs at least a portion of the natural gas. The vessel is sealed and waste heat from the turbogenerator is introduced through a heat transfer loop. With the increase of temperature within the vessel, the natural gas desorbs from the adsorbent material and compresses within the sealed, fixed volume of the vessel. Natural gas at an elevated pressure is then selectively released for use as fuel for the turbogenerator. Two vessels may be operated out of phase with each other, one adsorbing natural gas at ambient temperature while the other desorbing and discharging natural gas at an elevated temperature. At least two vessels are required to obtain relatively uninterrupted, higher pressure natural gas flow. More preferably, three vessels or more are so employed to provide a more uniform flow of natural gas, among other things.

Using waste heat energy from the turbogenerator for the compression of feed gas, rather than using electrical or mechanical power, may result in significant cost savings, potentially greater than efficiency gains in turbogenerator component improvements and material upgrades. To compress the feed gas to desired pressures, existing mechanical compression systems typically consume between 7% and 10% of the generated power from the turbogenerator. By eliminating the mechanical compression system, the present invention provides a corresponding 7% to 10% increase in system efficiency and a parallel decrease of $NO_x$ and $CO_2$ emissions per kilowatt. More specifically, the use of waste heat energy in this chemical compression apparatus and process reduces the power requirements to that of pumping heat exchange fluids, powering cooling fans and operating valves. This results in reducing the energy consumption penalty of feed gas compression to about ½% of the generated power.

Figure 1:
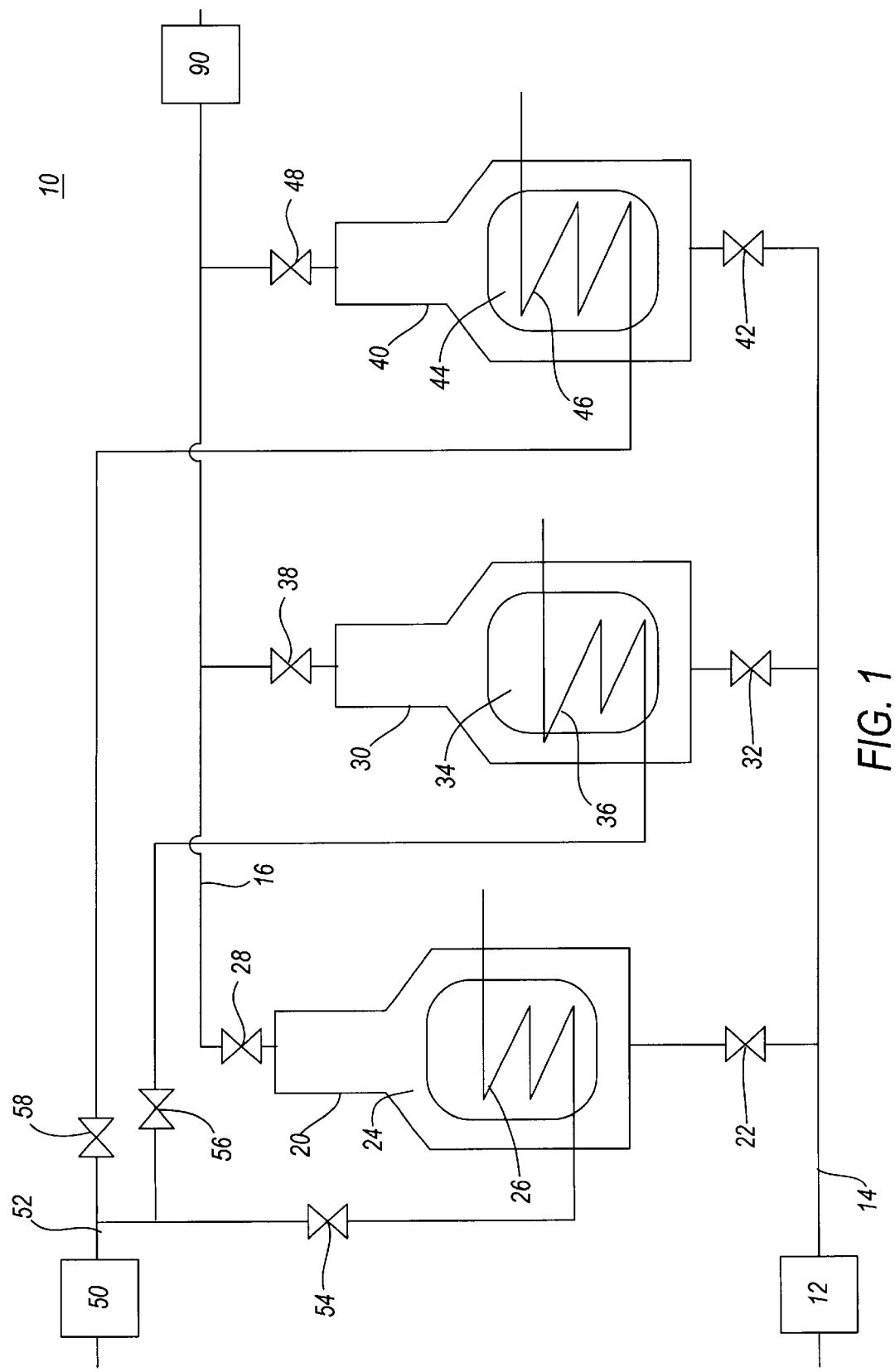
FIG. 1 is a schematic flow diagram of one embodiment of the present invention.

One embodiment of the present invention is shown in FIG. 1. A chemical compressor assembly 10 comprises a source of natural gas 12, a first vessel 20 containing first adsorbent material 24 and first heat transfer mechanism 26, second vessel 30 containing second adsorbent material 34 and second heat transfer mechanism 36, third vessel 40 containing third adsorbent material 44 and third heat transfer mechanism 46 and connecting conduits and valves, as described more fully below.

Commercial low pressure natural gas generally is supplied at ambient temperature and at very slightly over ambient or local barometric pressure. As this local pressure varies with altitude and weather conditions, one generally refers to the pressure differential, or pounds per square inch differential (psid). This differential pressure generally has a minimum value of 7" of water or 0.25 psid. That is, the natural gas supply typically is assumed to be at local ambient conditions (temperature and pressure) plus this differential pressure. To simplify these matters, the turbine industry generally refers to the International Organization for Standardization (ISO) standard day conditions, which are sea level altitude, 14.694 pounds per square inch absolute (psia), and 59° F. Any other combination of temperature and pressure can be referred to these conditions, or conversely, those practiced in the art can infer from a process at these conditions the resultant process at any other practical set of conditions. The ambient conditions surrounding the chemical compressor assembly 10 may encompass a wide range of temperatures and pressures, such as temperatures ranging from −200° F. to 120° F. and altitudes from sea level to 10,000 feet above sea level. In typical applications, the inlet conditions for the source of natural gas 12 generally would be approximately ambient temperature and at least 0.25 psid above ambient pressure, that is, 59° F. and 14.944 psia, ISO.

Preferably, the pressure of the natural gas exiting the chemical compressor assembly 10 would be approximately 15 psid above the maximum cycle pressure, depending on pressure losses in the fuel delivery system. For a low pressure ratio cycle, such as 4:1, the exit pressure preferably would be about 75 psia. For a higher pressure ratio cycle, such as 10:1, the exit pressure preferably would be about 165 psia. The exit temperature is a function of the desorb heat source temperature, which would be approximately 550° F. for recuperated cycles and approximately 1000° F. for non-recuperated cycles.

First vessel 20 is a standard material reaction vessel, the volume of which depends on the power size of the turbogenerator and the capacity of the adsorbent material, among other things. Preferably, first vessel 20 is approximately 1200 liters for a 1 megawatt turbogenerator, approximately 500 liters for a 350 kilowatt turbogenerator and approximately 100 liters for a 75 kilowatt turbogenerator. First vessel preferably is constructed of low grade metal, such as mild steel, that is capable of operating at temperatures of approximately −60° F. to 1000° F. and operating at pressures of approximately 0.1 atmospheres to 20 atmospheres. Second vessel 30, third vessel 40, and any additional vessels, also may be standard material reaction vessels and, for simplicity of design, construction and operation, preferably are constructed and operated in the same manner as the first vessel 20.

First heat transfer mechanism 26 may be any of a variety of heat transfer mechanisms known in the art, and preferably is a heat transfer coil to transport a heat transfer liquid, such as water/glycol, various oils or synthetics. Heat transfer mechanisms suitable for this application are readily available in the industry and need not be constructed of high strength or high temperature materials. Preferably, second heat transfer mechanism 36 of second vessel 30 and third heat transfer mechanism 46 of third vessel 40 are each separate from the first heat transfer mechanism 26, but are connected to the same source of energy and are otherwise designed, constructed and operated in the same manner as the first heat transfer mechanism 26. Additional vessels, if any, also preferably include a similarly designed heat transfer mechanism, preferably connected to the same source of heat. Alternatively, but less preferred, each heat transfer mechanism, or a combination of heat transfer mechanisms less than all of them, can be connected to separate sources of energy or otherwise operate independently of other heat transfer mechanisms.

An accumulator is preferably provided downstream from the bank of vessels to facilitate more uniform natural gas delivery flow and pressure, especially during load transients. The accumulator may be equipped with an adsorbent material and a heat transfer mechanism to increase its storage capacity, and thereby reduce its volume, and to modulate natural gas flow by adding heat with the hot side or removing heat with the cold side of the heat transfer mechanism. Generally, the accumulator is larger than the volume of the first vessel 20, second vessel 30 and third vessel 40, preferably is several times the volume of such vessels, and more preferably is two or three times the volume of such vessels and most preferably is approximately one and one-half time the volume of such vessels.

More preferably, a fourth vessel is incorporated into the chemical compressor assembly 10, with a corresponding fourth adsorbent material and fourth heat transfer mechanism. During the times when the first vessel 20, second vessel 30 and third vessel 40 are each in operating condition, the fourth vessel may be utilized as an accumulator. When one or more of the first 20, second 30 or third 40 vessels is, taken out of operation, the fourth vessel may then be operated as a chemical compressor of natural gas, and not simply as an accumulator. For an additional safeguard to maintain efficient operation of the chemical compressor assembly 10 during maintenance, repair, replacement or any other time of non-operation of a vessel, a separate accumulator may be incorporated in addition to the fourth vessel.

An after cooler may be employed to cool the compressed gas to a temperature, typically approximately 150° F., compatible with its intended use. The after cooler may be a separate piece of equipment conventional in the industry. However, it is preferred to utilize the accumulator and more preferred to use an additional vessel, such as the fourth vessel referred to above, as an accumulator and after cooler. The equipment functioning as the after cooler may also be used to store the compressed gas.

The source of heat for the first heat transfer mechanism 26 may be any energy conversion device, or combination of devices, capable of delivering the desired amount of heat. The preferred heat content is generally proportional to the volume of the vessel. Preferably the waste heat of the turbogenerator is a partial or primary source of such heat and, more preferably, is the sole source of such heat. A typical 75 kilowatt turbogenerator generates approximately 540,000 Btu/hour in waste heat, approximately 2–3% of which (approximately 12,000 Btu/hour to 16,000 Btu/hour) is generally required to compress the feed 34 kg/hour of natural gas from atmospheric pressure to the preferred 4–5 atmospheres.

Preferably, the chemical compressor assembly 10 also comprises an auxiliary source of heat, such as a natural gas fired heater. By providing an auxiliary source of heat, the chemical compressor assembly 10 may operate when the turbogenerator or other energy conversion device is not operating. This may also be advantageous for starting the turbogenerator or other energy device, or for augmenting the compression process for faster response to sudden transient load application. For example, after the turbogenerator has been stopped for a period of time, the vessels 20, 30, 40 will cool down to ambient temperature. The natural gas will be adsorbed in the adsorbent material 24, 34, 44, but will not be available to fuel the turbine. An auxiliary source of heat may then be employed to heat one or more of the vessels 20, 30

40, which will de-sorb the natural gas so that the turbogenerator can be fueled and started. After the turbogenerator is on and generating exhaust heat, this auxiliary heat source may be turned off. This auxiliary heat device preferably burns fuel from a standard low pressure fuel delivery source, which is generally approximately ¼ pound per square inch above ambient pressure.

Also, the preferred heat transfer mechanisms and vessels described have a rather slow time constant (approximately 3 cycles/minute). If a sudden demand for power is commanded, the auxiliary source of heat may also be used to more rapidly raise the temperature within one or more of the vessels 20, 30, 40 and thereby increase the rate of fuel desorption. Preferably, the natural gas fired heater is approximately 666 lbs/hour for a chemical compressor assembly for use with a 1 megawatt turbogenerator, approximately 234 lbs/hour for a chemical compressor assembly for use with a 350 kilowatt turbogenerator, and approximately 50 lbs/hour for a chemical compressor assembly for use with a 75 kilowatt turbogenerator.

Separate heat transfer mechanisms may be employed to heat and to cool the first vessel 20, second vessel 30 and third vessel 40. Preferably, one heat transfer loop is employed for heating all vessels and another separate heat transfer loop for cooling all vessels. In one embodiment, shown in FIG. 2, a single source provides the heat for each of vessels 20, 30, 40. With respect to first vessel 20, heat transfer mechanism 26 provides heat for the desorbing stage, while similarly designed cooling mechanism 64 removes heat for the adsorbing stage. Preferably, cooling mechanisms 64, 66, 68 use the same type of fluid as the heat transfer mechanisms 26, 36, 46, which is transported from a fan 62 powered ambient heat exchanger 60 to the cooling mechanisms 64, 66, 68. Most preferably, the same coil within each vessel 20, 30, 40 is used for both the heating mechanism and the cooling mechanism.

The first adsorbent material 24 may be any material that has a relatively high affinity of fuel gases at a first set of conditions and a relatively low affinity at a second set of conditions. Preferably, first adsorbent material 24 is capable of adsorbing methane or natural gas at a relatively low temperature, most preferably approximately ambient temperature, and capable of desorbing methane or natural gas at a relatively higher temperature. Most preferably, first adsorbent material 24 is capable of delivering at least 20 kilograms of methane per cycle and per cubic meter of volume at 1 atmosphere and 85° F. during adsorption and 4–5 atmospheres and 400° F. during desorption.

Preferably, the first adsorbent material 24 is a solid adsorbent, such as carbon molecular sieves, zeolites, activated alumina, activated silicas or activated carbon. The selection of the adsorbent material involves several factors, including the dynamic capacity of the adsorbent material for the adsorption of fuel gas under supply conditions, the dynamic desorption efficiency of the adsorbent material at pressures and temperatures attainable by using waste heat, the kinetic adsorption/desorption rates, the thermal stability of the adsorbent material, the long term cycle life of the adsorbent material under operational conditions, and the cost of the adsorbent material. More preferably, first adsorbent material 24 is an activated carbon medium with an architecture designed to adsorb and desorb methane, the primary constituent of natural gas. Most preferably, first adsorbent material is a carbon molecular sieve that is designed to exhibit high working capacity for methane at the operating conditions.

If solid, adsorbent material 24 may be a variety of shapes and sizes and preferably is constructed of the materials identified above and shaped as granules or immobilized solids. Preferably, adsorbent material 24 substantially fills the interior of first vessel 20, second vessel 30 and third vessel 40.

Alternatively, the first adsorbent material 24 may be a supported or liquid adsorbent, such as organic solvents, chemical complexants or methane hydrates. In a liquid adsorbent system, the adsorbent material may be loaded with natural gas in a contacting device and pumped through a heat exchanger, raising the temperature and thereby raising the pressure of the natural gas. The adsorbent material and natural gas may then be recycled to back to the low pressure contactor. Such a system provides a rapid cycling of the adsorbent between loaded and unloaded states and a pulse-free stream of natural gas. It also provides an efficient use of waste heat by transferring waste heat directly from the turbogenerator to the adsorbent material, rather than to a heat transfer fluid.

In general, the liquid adsorbent preferably has a high differential between the saturation loading for natural gas components at the low temperature, low pressure inlet and at the high temperature, high pressure outlet. Also, the liquid adsorbent preferably has a high capacity for methane and other components of natural gas and rapid kinetics for loading and regeneration. More preferably, the liquid adsorbent is non-corrosive, relatively safe to handle and has a boiling point sufficiently high to avoid significant losses at the high temperatures utilized.

The second adsorbent material 34, the third adsorbent material 44, and the adsorbent material of additional vessels, if any, may be any one or combination of the above materials. For simplicity in design and operation, and to reduce costs, preferably the adsorbent material in all vessels is the same or substantially the same.

A source of natural gas 12, generally slightly above atmospheric pressure, is commonly available at or near the site of the turbogenerator. Natural gas contains gaseous constituents other than methane, in amounts typically varying from about 5–10%. These other gases primarily are heavier molecular weight hydrocarbons, many of which will not adsorb into the adsorbent material as well as methane. Any such other gases that are not adsorbed will be compressed in the higher temperature phase by the desorbing methane, which is the largest proportion of the flow. These other gases will pass though the chemical compressor assembly 10 at the elevated pressure of the compressed methane, as would any methane that is not adsorbed. These other gaseous constituents generally do not cause a hindrance to the operation of the chemical compressor assembly 10, when present in the typical amounts of approximately 5–10%. However, as the relative amount of such other gaseous constituents increases beyond those levels, adjustments to the chemical compressor assembly 10 may be desired, such as increasing the porosity of the adsorbent material or increasing the volume of the vessels.

Figure 4:
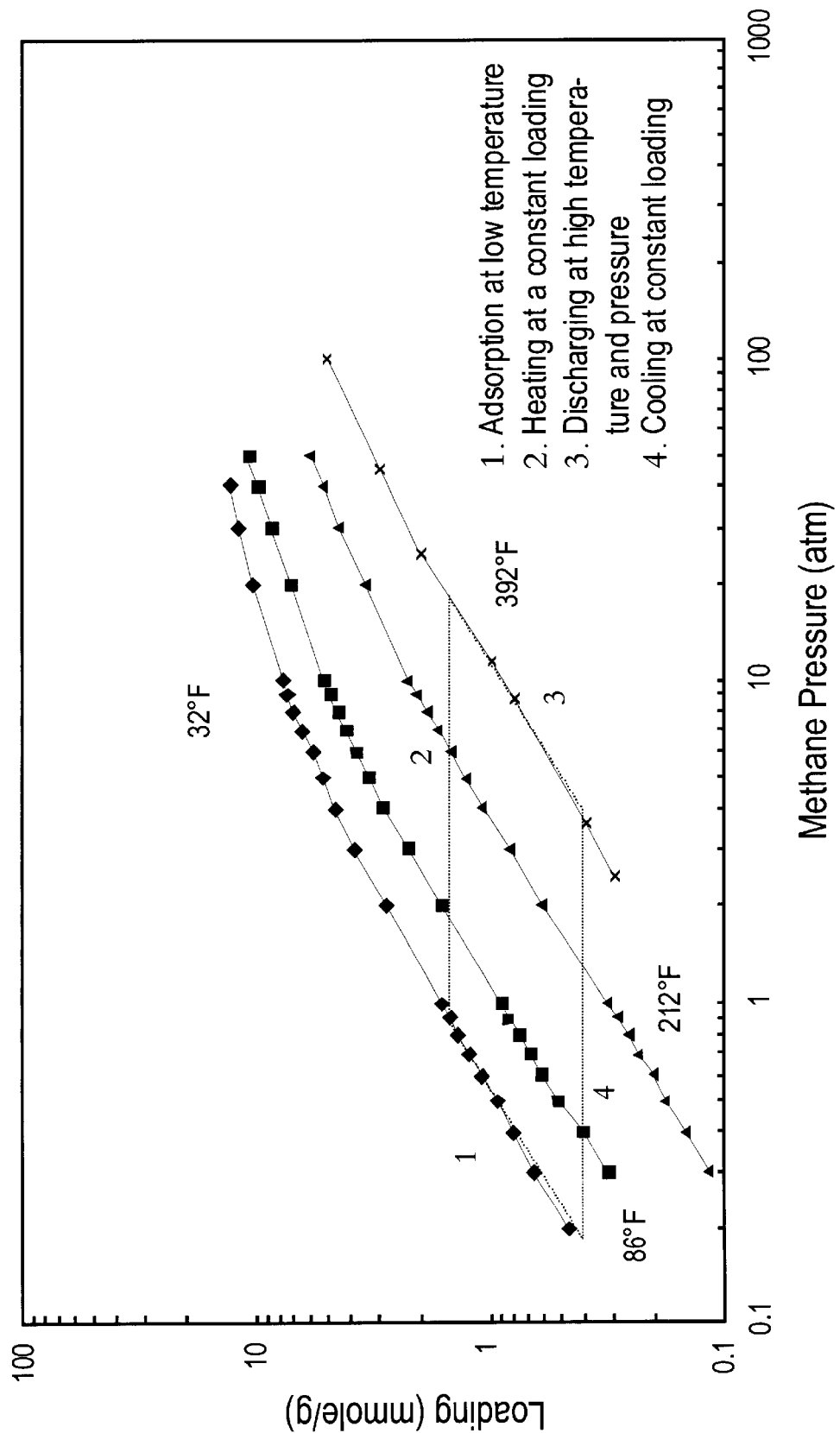
FIG. 4 is a chart depicting methane adsorption isotherms on PX-21 carbon, with loading of methane in mmole/gram.
Figure 5:
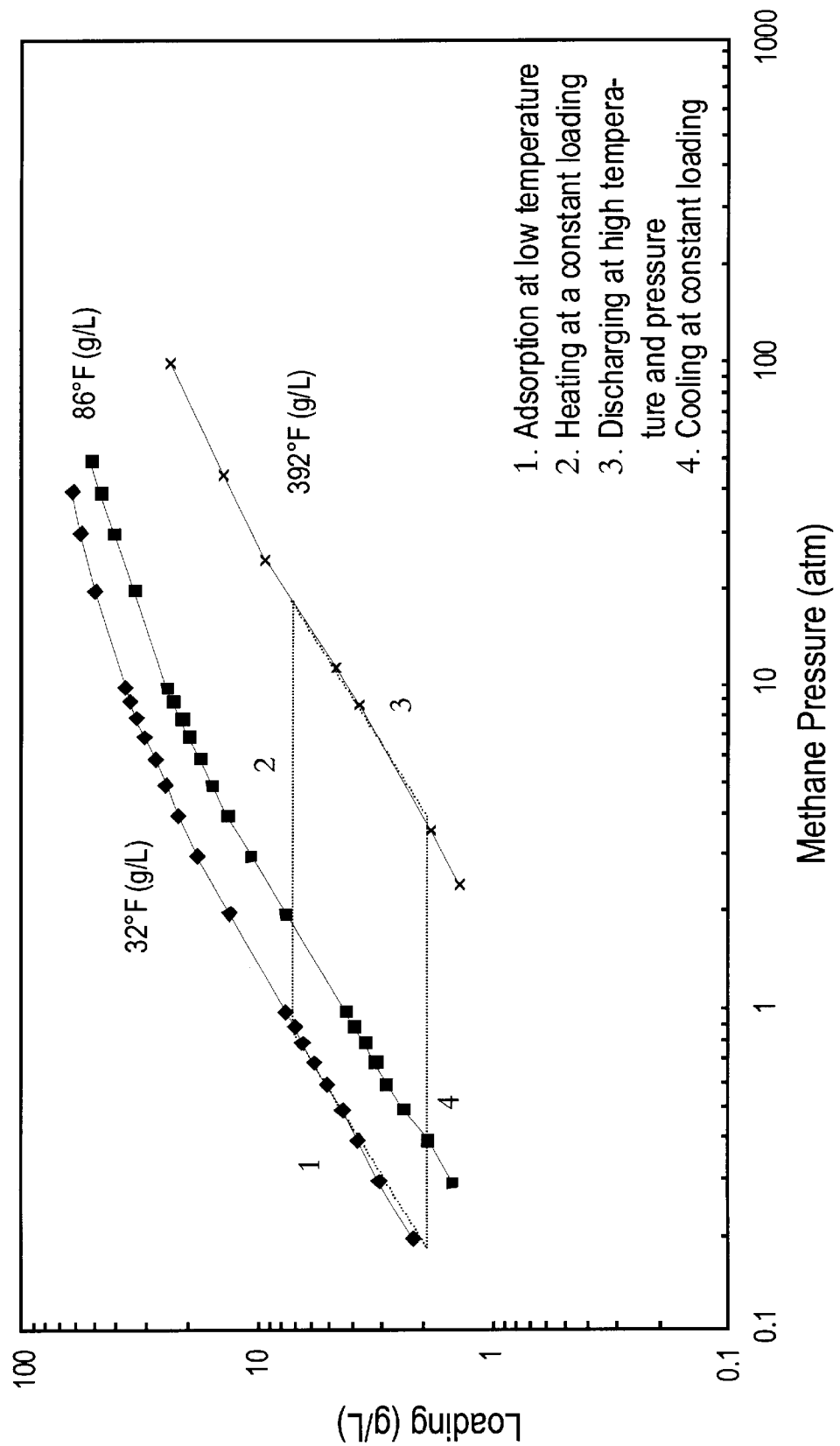
FIG. 5 is a chart depicting methane adsorption isotherms on PX-21 carbon, with loading of methane in grams/liter.

Methane gas may be compressed at relatively low temperatures to a pressure suitable for use in an industrial turbogenerator. As examples, FIGS. 4 and 5 show methane adsorption isotherms on PX-21 under noted conditions. Line 1 depicts loading of methane into the vessel until the example PX-21 carbon material is in equilibrium with a one atmosphere pressure at low temperature. As shown in Line 2, the temperature within the vessel is then increased, in this example to 400° F., using waste heat from the turbogenerator. The heating of the adsorbent material at a constant loading results in higher pressures, as shown by the horizontal operation line. At the desired pressure, methane is then released from the vessel at an elevated temperature and pressure. The amount of methane desorbed depends on the gradient of the isotherm values. Line 3 depicts the results of the temperature within the vessel cooling.

The capacity of the chemical compressor assembly 10, as well as its size and cost, is directly related to the capacity at 32° F. and 1 atmosphere and the capacity at 392° F. and 4 atmospheres. At a discharge pressure of 4 atmospheres and adsorbent material temperature of 392° F., the capacity of the activated carbon for methane is approximately 6 grams per liter of carbon per cycle.

The data shown in FIGS. 4 and 5 is specifically for methane gas, although alternative fuel such as natural gas, which is primarily methane, biomass derived fuels, synthetic gas fuels such as from coal liquifaction, and hydrogen generally behave in a similar manner. Similarly, although the example cycle operates between 32° F. and 392° F., other temperatures may be used.

Referring to the embodiment shown in FIG. 1, a source of natural gas 12 in conduit 14, at approximately atmospheric pressure, is selectively directed through valve 22 into first vessel 20 and into contact with first adsorbent material 24. At least a portion of the natural gas is adsorbed onto first adsorbent material 24. During the adsorption stage, the first heat transfer mechanism 26 cools the first vessel 20, preferably as cold as practical. The heat transfer fluid, preferably a coolant, is delivered to the first heat transfer mechanism 26 after being cooled by a heat exchanger. In a preferred embodiment, this heat exchanger passes the fluid coolant on one side and ambient air on the other.

In one embodiment of the invention, valve 22 is closed approximately 20 seconds after it was opened. A source of heat 50, preferably waste heat from a turbogenerator, is transferred to first vessel 20 through a heat transfer fluid within conduit 52 through valve 54 and into first heat transfer mechanism 26. Preferably, the first heat transfer mechanism 26 is capable of heating the temperature within the first vessel 20 to approximately 300° F. to 400° F. within this time period. With the increase in temperature, the natural gas desorbs from the first adsorbent material 26 and compresses within the sealed, fixed volume of the first vessel 20.

During the desorption stage, it is generally preferable to raise the temperature of the first vessel 20 as high as practical, which will depend a number a variables, including the temperature of the waste heat or exhaust and the efficiencies of the heat transfer equipment. In a turbogenerator with a recuperated cycle, the turbogenerator exhaust and compressor discharge typically pass through a relatively large heat exchanger to preheat the compressor air. This results in greater fuel and other efficiencies for the turbogenerator, but also significantly lowers the temperature of the waste heat. A turbogenerator with a non-recuperated cycle would require a higher fuel flow, but would also generate waste heat at a higher temperature. Choosing the particular manner of transferring heat within the first vessel 20 is within the capabilities of those of ordinary skill in the art.

After approximately 20 seconds, valve 28 is opened, releasing the natural gas at an elevated temperature and pressure, preferably approximately 400° F. and 4 atmospheres, into conduit 16. Preferably, the higher pressure natural gas is directed to accumulator 90 for approximately 20 seconds. Valve 54 is also closed to stop the transfer of heat into first vessel 20.

The efficiency of subsequent adsorption and desorption cycles within first vessel 20 may be improved by cooling after the higher pressure natural gas has been removed. Preferably, first heat transfer mechanism 26 includes a mechanism to vent remaining heat. More preferably, a fan 62 powers an ambient heat exchanger 60 to provide cooling fluid to cooling mechanism 64.

The first heat transfer mechanism 26 may include one mechanism to heat the first vessel 20, such as a heat transfer coil containing heated liquid or gas, and another mechanism to cool the first vessel 20, such as a second heat transfer coil containing cooled liquid or gas. More preferably, the first heat transfer mechanism 26 utilizes one mechanism, i.e., the same heat transfer coil for both heating and cooling of the first vessel 20.

As shown in FIG. 1, preferably three vessels are utilized and operated out of phase with each other to provide a more uniform flow of higher pressure natural gas. While vessel 20 is adsorbing natural gas in the first 20 seconds, vessel 30 is being heated by the heat transfer mechanism 36, vessel 40 is releasing natural gas to the accumulator. In the next 20 seconds, vessel 20 is being heated, vessel 30 is releasing natural and vessel 40 is adsorbing natural gas. The rotation continues with, at any given time, one vessel adsorbing natural gas, one vessel desobring natural gas, and another vessel cooling. Therefore, compressed natural gas is being released to the accumulator in a substantially continuous flow.

Figure 2:
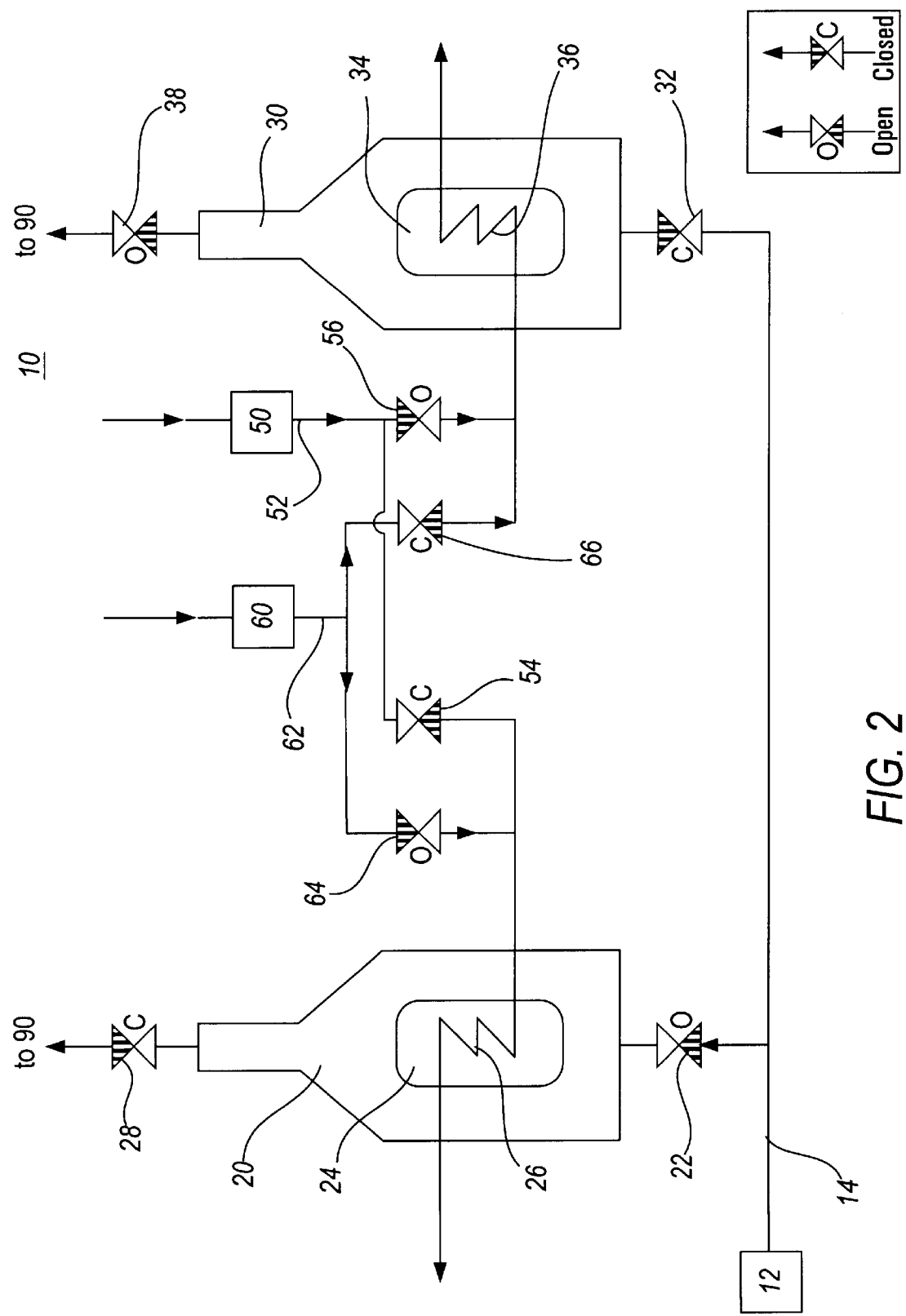
FIG. 2 is a schematic flow diagram of another embodiment of the present invention.

Another embodiment of the present invention is depicted in FIG. 2, which generally shows a two vessel chemical compression system having a single heat transfer coil within each vessel. Again, a chemical compressor assembly 10 comprises a first vessel 20 containing first adsorbent material 24 and first heat transfer mechanism 26 and a second vessel 30 containing second adsorbent material 34 and second heat transfer mechanism 36, as well as a gas source 12, a heat source 50, a cold source 60, connecting conduits and valves, among others things, as described more fully below.

In this embodiment, a source of natural gas 12 is selectively directed through conduit 14 through valve 22 into first vessel 20 and into contact with first adsorbent material 24. At least a portion of the natural gas is adsorbed onto first adsorbent material 24. During this time, release valve 28 is closed while the cold source 60 is provided through conduit 62 and valve 64 into first heat transfer mechanism 26. As described above, the cooling environment facilitates adsorption of the gas onto the adsorbent material. The preferred operating conditions during this stage are approximately 15_ F. to 85_ F. and approximately 5 pounds per square inch to 20 pounds per square inch. After approximately 20 seconds, valve 22 is closed to shut off the source of gas and valve 64 is closed to shut off the cold source. Further, valve 54 is opened introducing the heat source 50 through conduit 52 into first heat transfer mechanism 26. As described above, the increased heat causes the methane to desorb from the adsorbent material and exit first vessel 20 through valve 28. Preferably valve 28 is a check valve that opens when the pressure equals the pressure in the accumulator 90 and closes when the pressure drops to less than that of the accumulator, for example when the vessel is adsorbing methane.

During the time period that first vessel 20 is desorbing the methane, i.e., during the time valve 22 is closed, valve 64 is closed and valve 54 is opened, additional natural gas is introduced through conduit 14 and valve 32 into second vessel 30. Similarly, cold source 60 is introduced through valve 66 into second heat transfer mechanism 36 thereby facilitating the adsorption of natural gas onto the second adsorbent material 34.

In the two vessel system depicted in FIG. 2, the valves preferably would be reversed approximately every 20 seconds. As depicted in FIG. 2, the valves are shown in their respective positions, whether opened or closed, to show adsorption within the first vessel 20 and desorption within the second vessel 30. In a two vessel system, this creates a dead period while the vessels are heating and cooling thereby resulting in a gas delivery fluctuation. The accumulator 90 or an additional vessel, as described above, could be used to help dampen this fluctuation.

The embodiment of the invention depicted in FIG. 2 uses a single heat exchanger 26 for both the heating and cooling functions of first vessel 20 and a single heat exchanger for both the heating and cooling functions of second vessel 30. In this embodiment, a common fluid is used for both heating and cooling. One of ordinary skill in the art would select an appropriate fluid for the operating parameters of the particular application. In general, it is preferred to use a fluid with a boiling point in excess of approximately 500 degrees Fahrenheit, such as a high temperature oil. Fluids with lower boiling points, such as water/glycol, may be used, but would require higher operating pressures.

Figure 3:
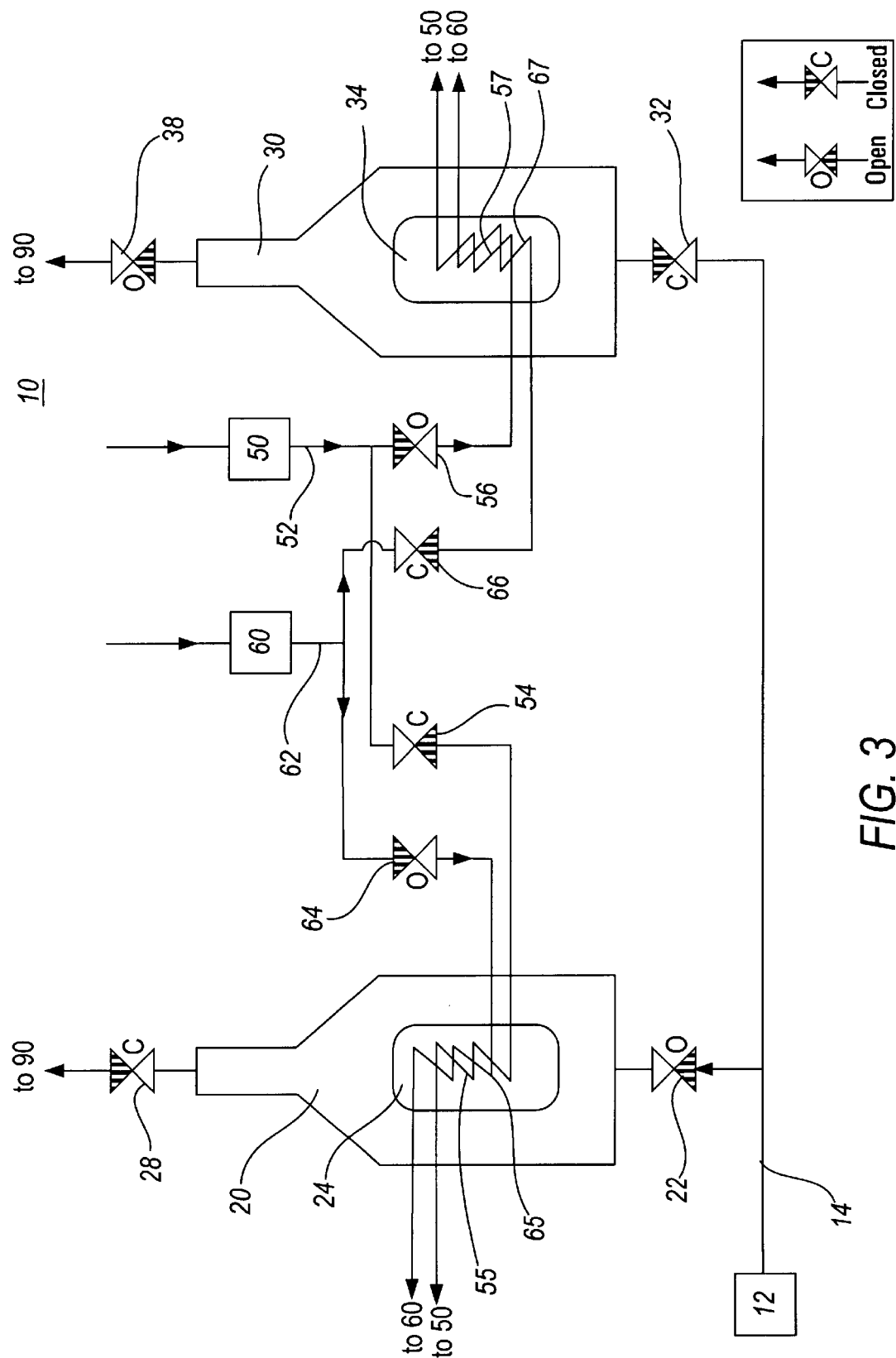
FIG. 3 is a schematic flow diagram of yet another embodiment of the present invention.

In yet another embodiment depicted in FIG. 3, a two vessel chemical compression system is depicted in which employs a separate cooling mechanism and heating mechanism within each vessel. For example, first vessel 20 includes a heat transfer mechanism 55 which is connected to conduit 52 through valve 54 to heat source 50. First vessel 20 also includes a cooling mechanism 65 connected through conduit 62 through valve 64 to cooling source 60. Similarly, second vessel 30 contains a heat transfer mechanism 57 and a cooling mechanism 67 similarly connected to heat source 50 and cooling source 60. This embodiment of the invention may be operated in the same manner as that depicted in FIG. 2 as set forth above. However, by separating the heating and cooling functions into heating mechanisms 55 and 57 and cooling mechanisms 65 and 67, different heat transfer fluids may be used. For example, heated air from the turbogenerator exhaust may be used in the heating mechanisms 55 and 57, while water/glycol may be used in the cooling mechanisms 65 and 67. Using different fluids may require different equipment, for example, using heated air would require larger and different heat exchangers than using water/glycol or other liquid.

The single heat exchanger mechanism, one embodiment of which is depicted in FIG. 2, requires mixing of the heating and cooling fluids during transitions, but generally is mechanically simpler and lower in cost. Overall, the single heat exchanger mechanism is preferred.

The gas turbine in a typical turbogenerator compresses inlet air with a centrifugal compressor to the desired operating pressure. This operating pressure varies with inlet conditions, component efficiencies, pressure drops and power setting, among other things. However, the maximum pressure can be based on the pressure ratio designed into the compressor. For example, a compressor having a pressure ratio of 4:1 will compress air at ISO conditions to 58.78 psia or 44.08 psid. To fuel the combustion system, natural gas must be supplied at something above this, preferably approximately 15 psid over the nominal maximum operating pressure, which is about 75 psia at ISO conditions. Depending on the pressure drops in the fuel delivery system, this pressure margin may be either higher or lower.

The present invention may be used in a variety of other applications, including pumping natural gas or augmenting the pressure of a supply system or pipeline. In such uses, it would be preferable to supply a heat exchanger to aftercool the compressed gas, e.g., by using the cool side of the fluid heat transfer system. This would return the gas to the original temperature so that the distribution system downstream would not be adversely impacted.

The foregoing description of the present invention has been presented for purposes of illustration and description. The description is not intended to limit the invention to the forms disclosed herein. Consequently, variations and modifications commensurate with the above teachings, and the skill or knowledge of the relevant art, are within the scope of the present invention. The embodiments described herein are further intended to explain the best mode known for practicing the invention and to enable others skilled in the art to utilize the invention in such, or other, embodiments and with various modifications required by the particular applications or uses of the present invention. It is intended that the appended claims be construed to include embodiments to the extent permitted by the prior art.

What is claimed is:

1. A method to increase the pressure of a feed gas, comprising:

providing a first set of conditions within a first chamber;

introducing a first quantity of feed gas into said first chamber, said first chamber containing a first adsorbent material capable of adsorbing at least a portion of said first quantity of feed gas under said first set of conditions and desorbing at least a portion of said first quantity of feed gas under a second set of conditions;

allowing at least a portion of said first quantity of feed gas to adsorb onto said first adsorbent material;

providing a second set of conditions within said first chamber; whereby at least a portion of said first quantity of feed gas is desorbed from said first adsorbent material;

releasing said first quantity of feed gas at an increased pressure from said first chamber;

providing a third set of conditions within a second chamber, substantially by the time said first quantity of feed gas is released from said first chamber;

introducing a second quantity of feed gas into said second chamber, said second chamber containing a second absorbent material capable of adsorbing at least a portion of said second quantity of feed gas under said third set of conditions and desorbing at least a portion of said second quantity of feed gas under a fourth set of conditions;

allowing at least a portion of said second quantity of feed gas to adsorb onto said second adsorbent material;

providing said fourth set of conditions within said second chamber; whereby at least a portion of said second quantity of feed gas is desorbed from said second adsorbent material; and releasing said second quantity of feed gas at an increased pressure from said second chamber.

2. The method to increase the pressure of a feed gas of claim 1, wherein:

said first set of conditions comprises a temperature in the range of approximately −20° F. to approximately 120° F. and a pressure in the range of approximately 11 psia to approximately 20 psia; and said second set of conditions comprises a temperature in the range of approximately 160° F. to approximately 560° F. and a pressure in the range of approximately 60 psia to approximately 150 psia.

3. The method to increase the pressure of a feed gas of claim 1, wherein said step of providing a second set of conditions comprises heating said first chamber.

4. The method to increase the pressure of a feed gas of claim 1, wherein said step of providing a second set of conditions comprises heating said first chamber with waste heat from a generator.

5. The method to increase the pressure of a feed gas of claim 1, wherein said step of providing a second set of conditions comprises heating said first chamber with a fluid heat exchanger.

6. The method to increase the pressure of a feed gas of claim 1, wherein said step of providing a second set of conditions comprises heating said first chamber with heat from an auxiliary heater.

7. The method to increase the pressure of a feed gas of claim 1, wherein said step of providing a first set of conditions comprises cooling said first chamber to a substantially ambient temperature and pressure with a fluid heat exchanger.

8. The method to increase the pressure of a feed gas of claim 1, wherein said step of providing a second set of conditions comprises heating said first chamber with a fluid heat exchanger; and said step of providing a first set of conditions comprises cooling said first chamber with a fluid heat exchanger.

9. The method to increase the pressure of a feed gas of claim 1, wherein said adsorbent material is selected from the group consisting of carbon molecular sieves, zeolites, activated alumina, activated silicas and activated carbon.

10. The method to increase the pressure of a feed gas of claim 1, wherein said feed gas comprises natural gas.

11. The method to increase the pressure of a feed gas of claim 1, wherein said feed gas comprises methane.

12. The method of increasing the pressure of a feed gas of claim 1, wherein said first quantity of feed gas is released from said first chamber at a pressure in the range of approximately 60 pounds per square inch to approximately 150 pounds per square inch.

13. The method of increasing the pressure of a feed gas of claim 1, wherein said first set of conditions and said third set of conditions are substantially the same.

14. The method of increasing the pressure of a feed gas of claim 1, wherein said second set of conditions and said fourth set of conditions are substantially the same.

15. The method of increasing the pressure of a feed gas of claim 1, wherein said first adsorbent and said second adsorbent are substantially the same.

16. The method of increasing the pressure of a feed gas of claim 1, wherein said first adsorbent and said second adsorbent are selected from the group consisting of carbon molecular sieves, zeolites, activated alumina, activated silicas and activated carbon.

17. The method of increasing the pressure of a feed gas of claim 1, further comprising:
transferring said first quantity of feed gas at an increased pressure from said first chamber to an accumulator; and
transferring said second quantity of feed gas at an increased pressure to said accumulator.

18. The method of increasing the pressure of a feed gas of claim 1, further comprising:
providing a first set of conditions within a third chamber, substantially by the time said second quantity of feed gas is released from said second chamber;
introducing a third quantity of feed gas into said third chamber, said third chamber containing a third adsorbent material capable of adsorbing at least a portion of said third quantity of feed gas under said fifth set of conditions and desorbing at least a portion of said third quantity of feed gas under a sixth set of conditions;
allowing at least a portion of said third quantity of feed gas to adsorb onto said third adsorbent material;
providing said sixth set of conditions within said third chamber; whereby at least a portion of said third quantity of feed gas is desorbed from said third adsorbent material; and
releasing said third quantity of feed gas at an increased pressure from said third chamber.

19. The method of increasing the pressure of a feed gas of claim 18, wherein said first set of conditions, said third set of conditions and said fifth set of conditions are substantially the same.

20. The method of increasing the pressure of a feed gas of claim 18, wherein said second set of conditions, said fourth set of conditions, and said sixth set of conditions are substantially the same.

21. The method of increasing the pressure of a feed gas of claim 18 wherein said first adsorbent, said second adsorbent, and said third adsorbent are substantially the same.

22. A method of providing a flow of feed gas at an increased pressure, comprising:
initiating a first cycle by introducing a first quantity of said feed gas into a first vessel at a first set of conditions, said first vessel containing a first quantity of adsorbent material capable of adsorbing at least a portion of said first quantity of feed gas under said first set of conditions and capable of desorbing at least a portion of said first quantity of feed gas under a second set of conditions;
adsorbing at least a portion of said first quantity of feed gas onto said first adsorbent material;
heating said first vessel to said second set of conditions, whereby at least a portion of said first quantity of feed gas desorbs from said first adsorbent material;
introducing a second quantity of said feed gas into a second vessel at substantially said first set of conditions, said second vessel containing a second adsorbent material capable of adsorbing at least a portion of said feed gas under said first set of conditions and capable of desorbing at least a portion of said feed gas under said second set of conditions;
adsorbing at least a portion of said second quantity of feed gas onto said second adsorbent material;
releasing said first quantity of feed gas at an increased pressure from said first vessel to an accumulator;
heating said second vessel to substantially said second set of conditions, whereby at least a portion of said second quantity of feed gas desorbs from said second adsorbent material;
introducing a third quantity of said feed gas into a third vessel at substantially said first set of conditions, said third vessel containing a third adsorbent material capable of adsorbing at least a portion of said feed gas under said first set of conditions and capable of desorbing at least a portion of said feed gas under said second set of conditions;
adsorbing at least a portion of said third quantity of feed gas onto said third adsorbent material;
releasing said second quantity of feed gas at an increased pressure from said second vessel to an accumulator;
heating said third vessel to substantially said second set of conditions, whereby at least a portion of said second quantity of feed gas desorbs from said third adsorbent material;

initiating a second cycle by introducing a fourth quantity of said feed gas to said first vessel at substantially said first set of conditions; and releasing said third quantity of feed gas at an increased pressure from said third vessel to an accumulator, whereby said second cycle operates in substantially the same manner as said first cycle.

23. The method of claim 22, further comprising repeating said first cycle and said second cycle to provide a substantially continuous flow of feed gas at an increased pressure to said accumulator.

24. The method of claim 22, further comprising releasing said feed gas from said accumulator at a substantially continuous rate.

25. The method of claim 22, wherein said step of heating said first vessel during said first cycle is provided by the use of an auxiliary heater.

* * * * *